Patented Nov. 3, 1953

2,657,999

UNITED STATES PATENT OFFICE 2,657,999

METHOD OF PREPARING SOUP

Albert C. Rauch, Blue Island, Ill.

No Drawing. Application March 6, 1950,
Serial No. 148,019

5 Claims. (Cl. 99—204)

(Granted under Title 35, U. S. Code (1952),
sec. 266)

The invention described herein, if patented, may be manufactured and used by or for the Government for governmental purposes, without the payment to me of any royalty thereon.

This invention relates to legume soup products and more particularly to improved soup products obtained by improved methods of preparing non-powdered bean and pea soup base materials which are easily rehydrated and reconstituted in short time intervals to the consistency and palatability of freshly cooked soups, without requiring additional cooking.

The problems concerning the preparation of dry bean and pea soup products would appear to be solved by the general application of cooking and grinding or comminuting in the manner as disclosed by prior developments in the culinary arts. However, despite such knowledge, there is not obtainable on the market, or from the art, any satisfactory product of this nature which can be reconstituted to the normal consistency of freshly prepared soups without the requirement of additional cooking, as is recommended.

Consequently, it is an object of this invention to provide improved dried bean and pea soup products which are easily reconstituted to the consistency and characteristics of freshly prepared soups by the mere addition of water without the necessity of cooking.

It is another object of this invention to provide improved methods for preparing improved particulate bean and pea soup base materials which can be easily rehydrated by the addition of water and with the added constituents of a soup mix giving the appearance and taste characteristics of freshly prepared soups without the necessity of cooking.

Another object of this invention is to provide improved legume products in the nature of precooked beans and peas, in other than powdered form, which are rehydratable in water at normal temperatures, for consumption without the necessity of cooking.

It is a further object of this invention to provide precooked seeds or fruits of the legume family in particulate form, having the starch grains gelatinized with the cellular structure separated to produce air spaces, yet retaining an aggregate porous form without disintegration upon rehydration.

Other objects and advantages of the improvements provided will be hereinafter set forth and obvious from the following description of my improved processing of beans and peas and the products obtained therefrom.

An illustrative description of my improved method of preparing an improved bean soup product, of the character herein described, is as follows:

A batch of beans, e. g. commercially dried Michigan pea beans, is washed with cold water at approximately 70° F. The beans are then soaked in water at this approximate temperature to full absorption capacity, on the order of 50 to 55%, for a period of from 12 to 16 hours. Thereafter, the soaked beans are blanched for approximately 6 minutes in boiling water to remove bitter flavor constituents.

After blanching, the soaked beans are placed in perforated containers and steam-pressure cooked in a retort at 245° F. for 20 minutes. The cooked beans may then be air-dried to remove surface moisture only, and thus facilitate their breakdown into particulate form, in the manner as herein described.

With or without drying of the surface moisture, the fully saturated cooked beans are placed in a hammer mill equipped with a screen having perforations no larger than ⅛ inch in diameter. The hammers are rotated at 3500 to 4500 R. P. M. and the mill is equipped with a blower which may be of a centrifugal type, or a conventional pressure tank maintained at from 50 to 100 pounds' pressure or more, with the air stream at normal non-drying temperatures directed on the screen to facilitate passage of the hammered bean particles through the perforations. The particulate material resulting from hammering the cooked legume through the screen is of a particle size not larger than ⅛ inch in cross-sectional diameter.

The comminuted product resulting from passage of the hammered material through the screened perforations is spread onto drying trays and dehydrated to a moisture level of from 0.84% to 7%, and preferably in commercial manufacture on the order of from 1.5% to 5%. This dehydration is obtained by providing a drying air stream maintained at a temperature of from 180° F. to 220° F. for a period of from 1 hour to 3 hours depending upon the moisture level desired. Ordinarily, for example, a temperature of 180° F. is maintained for the longer heating period and at higher temperatures a shortened time interval is utilized. Conventional moisture testing devices or conventional analysis of moisture content may be used to calculate and measure moisture values.

This dehydration may also be obtained by passing heated air through the comminuted product in a revolving cylinder. Initial air temperatures may range from about 600° F. to 900° F. resulting in a temperature range in the product during drying of about 120° F. to 225° F. Drying times may vary relatively from about 40 minutes to 15 minutes, or longer, depending upon the drying temperature utilized and the moisture level desired.

When a practical moisture level on the order of from 3% to 5% for the bean particles or from 2.5% to 5% for the pea particles has been reached, or slightly more or less within the limits as indicated, the dehydrated materials are in the form of irregular, light, porous clusters of smaller particles which may be reduced to uniform size by shaking through a standard 8 mesh or 10 mesh sieve, if desired. The starch content of the cells is believed to be completely gelatinized. The cells of the legume cotyledon have been separated to produce air spaces.

Under polarized light, the starch grains of the legume product, prepared in a manner as herein described, appear as a colloidal porous particle mass in contrast to their appearance when prepared by previously known methods. The porous particles have been discovered to be completely and rapidly dehydratable in the time relationship as hereinafter described.

In preparing a dehydrated pea soup base, of the character as herein described, which is readily rehydrated to form soup mixtures without need for additional cooking, a normally prepared batch of dried peas is treated substantially in the same manner as the process described for a dehydrated bean soup base, the only changes being in omission of the blanching step. Preferably, the peas are soaked and pressure-cooked at about 240° F. for about 20 minutes.

In order to obtain a soup mixture with the dehydrated base materials, prepared in the manner as above described, the bean or pea base is blended with prepared fatty materials (e. g. hydrogenated vegetable fat), salt, and seasoning in conventional proportions and agitated by a paddle mixer at relatively slow speeds at 100 to 250 R. P. M. to prevent breakdown of the legume particles and prevent alterations of reconstitution properties of the base material.

Such reconstitution properties have been discovered to be measurably improved in that the time interval for rehydration of bean and pea soup bases, prepared in accordance with my disclosure and having a moisture content of from 1.5 to around 4%, ranges from 1 minute to 1.5 minutes in water at a temperature of from 160° F. to 180° F. Even with cold tap water, ice water and water at room temperature complete rehydration occurs after a relatively greater time interval to produce a soup product equivalent to a freshly prepared soup product at the same temperatures. The reconstituted soups, utilizing the base material prepared in the manner herein described, have the general characteristics of well-cooked freshly prepared bean and pea soups, have soft granular texture, and show relatively no more separation of the prefabricated particulate masses than freshly prepared soups, processed by conventional methods, show breakdown of the whole bean material.

A pea soup product, prepared from the base materials described and having a moisture content of from 1.30% to 5.48%, when gently mixed in a proportion of from ½ oz. dry soup mix to 8 fluid oz. water at a temperature of from 160° F. to 180° F., rehydrates in the approximate time of 1 minute, and with the water at 100° F., rehydrates in from 3 to 4 minutes. The bean soup mix in the same relative proportions and at the temperature conditions of from 180° F. to 100° F., rehydrates in from 1 minute to 4.5 minutes, respectively. When the moisture content varies from 0.84% to 7.0%, the temperature changes from 100° F. to 180° F. are found to cause proportionately relative changes in the rehydration time between the periods as expressed.

Further, illustratively, reduction in water temperature causes an increase in rehydration time of the soup mix; as for example, with water at room temperature of 68° F. rehydration time for pea soup is on the order of 11 minutes and the rehydration time of bean soup is on the order of 12 minutes, and in ice-cooled water at a temperature of 38° F. the rehydration time for a dehydrated pea soup mix is approximately 16 minutes, and for the dehydrated bean soup mix approximately 18 minutes. Rehydration in tap water at 41.5° F. for pea soup mix is on the order of 15 minutes and for a bean soup mix on the order of 17 minutes. In any case, rehydration occurs without destruction of the particle structure or deterioration of the quality of the finished product.

By the methods as above described, there is produced, from the legume family group, bean and pea soup products of notably improved and palatable nature, showing no objectionable grittiness. This is in great contrast to the heretofore known soup powder or soup base products which require cooking, and which, unless re-cooked, form unpalatable, lumpy, and pasty products.

From the foregoing description of my development in improving the method of preparing bean and pea soup bases to produce the improved products derived therefrom, it will be apparent that like materials of the legume family may be processed in a similar manner, and will be included within the scope of the accompanying claims.

I claim:

1. In the process of preparing precooked legume soup bases, the steps of hammering a soaked and cooked legume through a perforated screen to provide legume particles having a diameter of not more than about ⅛ inch, and dehydrating the legume particles to form light, porous masses having a moisture content of from about 0.84% to about 7%.

2. The method of processing beans comprising soaking the beans in water, blanching the soaked beans, pressure-cooking the blanched beans for approximately 20 minutes at approximately 245° F., hammering the cooked beans through a perforated screen to reduce the bean material to a particulate form having a diameter of not more than about ⅛ inch, and dehydrating the bean particle to form light, porous masses having a moisture content of from about 0.84% to about 7%.

3. The method of processing peas comprising soaking the peas in water, pressure-cooking the peas for approximately 20 minutes at about 240° F., hammering the cooked peas through a perforated screen to reduce the pea material to particulate form having a diameter of not more than about ⅛ inch, and drying the pea particles to form light, porous masses having a moisture content of from about 1.30% to about 7%.

4. In the process of preparing precooked legume soup bases, the steps of hammering a hydrated cooked legume through a perforated screen to provide legume particles having a diameter of not more than about ⅛ inch, and dehydrating the legume particles to a final moisture content of from about 0.84% to about 7%.

5. In the process of preparing precooked legume food products, the steps of hammering a saturated cooked legume of the class of beans and peas through a perforated screen to provide legume particles having a cross-sectional diameter of not more than about ⅛ inch, and dehydrating the legume particles to a moisture content of from about 0.84% to about 7% at a body drying temperature of from 120° F. to 225° F. for a period of not less than 15 minutes.

ALBERT C. RAUCH.

References Cited in the file of this patent

UNITED STATES PATENTS

| Number | Name | Date |
| --- | --- | --- |
| 1,484,970 | Sherer | Feb. 26, 1924 |
| 2,334,059 | Bauer et al. | Nov. 9, 1943 |
| 2,391,829 | Huber | Dec. 25, 1945 |
| 2,475,554 | Moller | July 5, 1949 |

FOREIGN PATENTS

| Number | Country | Date |
| --- | --- | --- |
| 553,500 | Great Britain | 1943 |